US011235760B2

(12) United States Patent
Otsuka et al.

(10) Patent No.: US 11,235,760 B2
(45) Date of Patent: Feb. 1, 2022

(54) VEHICLE CONTROL DEVICE AND VEHICLE CONTROL SYSTEM

(71) Applicant: HITACHI AUTOMOTIVE SYSTEMS, LTD., Ibaraki (JP)

(72) Inventors: Satoshi Otsuka, Tokyo (JP); Kohei Sakurai, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 65 days.

(21) Appl. No.: 15/739,380

(22) PCT Filed: Jul. 22, 2016

(86) PCT No.: PCT/JP2016/071472
§ 371 (c)(1),
(2) Date: Dec. 22, 2017

(87) PCT Pub. No.: WO2017/038289
PCT Pub. Date: Mar. 9, 2017

(65) Prior Publication Data
US 2018/0170374 A1 Jun. 21, 2018

(30) Foreign Application Priority Data
Aug. 31, 2015 (JP) .............................. JP2015-169979

(51) Int. Cl.
*B60W 30/095* (2012.01)
*B60W 50/04* (2006.01)
(Continued)

(52) U.S. Cl.
CPC ......... *B60W 30/0956* (2013.01); *B60R 21/00* (2013.01); *B60T 7/12* (2013.01);
(Continued)

(58) Field of Classification Search
CPC combination set(s) only.
See application file for complete search history.

(56) References Cited

U.S. PATENT DOCUMENTS

2014/0297170 A1  10/2014  Sakima et al.
2014/0324286 A1  10/2014  Tsuchida
(Continued)

FOREIGN PATENT DOCUMENTS

DE  102013010004 A1 * 12/2014 ................ B60T 7/12
DE  102013010004 A1   12/2014
(Continued)

OTHER PUBLICATIONS

DE102013010004—translation (Year: 2013).*
(Continued)

*Primary Examiner* — Abby Y Lin
*Assistant Examiner* — Renee LaRose
(74) *Attorney, Agent, or Firm* — Volpe Koenig

(57) ABSTRACT

The purpose of the present invention is to provide a system in which the reliability of an automatic driving system can be excellently complemented by a different control system while the automatic driving system is effectively used. The vehicle control device outputs to a drive device one of a first control signal generated on the basis of automatic driving control information, and a second control signal generated on the basis of the relative information between a vehicle and a surrounding object. If an abnormality is detected in the automatic driving control information, the second control signal is output to the drive device in place of the first control signal.

12 Claims, 17 Drawing Sheets

(51) Int. Cl.

| | | |
|---|---|---|
| *B60T 8/88* | (2006.01) | |
| *B60W 50/02* | (2012.01) | |
| *B60T 17/18* | (2006.01) | |
| *B60T 17/22* | (2006.01) | |
| *B60R 21/00* | (2006.01) | |
| *G08G 1/16* | (2006.01) | |
| *G08G 1/00* | (2006.01) | |
| *B60T 7/12* | (2006.01) | |
| *B60W 30/09* | (2012.01) | |
| *B60W 30/14* | (2006.01) | |
| *B60W 30/18* | (2012.01) | |
| *B60W 50/00* | (2006.01) | |
| *G06K 9/00* | (2006.01) | |

(52) U.S. Cl.
CPC ................ *B60T 8/88* (2013.01); *B60T 17/18* (2013.01); *B60T 17/22* (2013.01); *B60W 30/09* (2013.01); *B60W 30/146* (2013.01); *B60W 30/18163* (2013.01); *B60W 50/0097* (2013.01); *B60W 50/02* (2013.01); *B60W 50/04* (2013.01); *G06K 9/00805* (2013.01); *G08G 1/00* (2013.01); *G08G 1/16* (2013.01)

(56) References Cited

U.S. PATENT DOCUMENTS

| | | | |
|---|---|---|---|
| 2015/0073705 A1* | 3/2015 | Hiwatashi | G01S 19/48 |
| | | | 701/468 |
| 2015/0134225 A1* | 5/2015 | Kinugawa | B60W 30/16 |
| | | | 701/96 |
| 2015/0302606 A1* | 10/2015 | Stein | G08G 1/16 |
| | | | 382/103 |
| 2016/0144838 A1 | 5/2016 | Spencer et al. | |

FOREIGN PATENT DOCUMENTS

| | | |
|---|---|---|
| JP | 08-034326 A | 2/1996 |
| JP | 09-282599 A | 10/1997 |
| JP | 2000-322689 A | 11/2000 |
| JP | 2012-035821 A | 2/2012 |
| JP | 2014-191597 A | 10/2014 |
| WO | 2015/028866 A1 | 3/2015 |

OTHER PUBLICATIONS

International Search Report dated Oct. 25, 2016 for the International Application No. PCT/JP22016/071472.

Extended European Search Report dated Mar. 15, 2019 for the European Patent Application No. 16841321.9.

* cited by examiner (a)

H/W CONFIGURATION OF ECU

SOFTWARE MODULE
CONFIGURATION OF ECU

FIG. 10

| OBJECT ID | RECOGNITION DEVICE ID | POSITION INFORMATION | TYPE | SPEED INFORMATION | RANGE | ... |
|---|---|---|---|---|---|---|
| Data_A | Sensor_A | xa, ya | AUTOMOBILE | 0.100 | dxa, dya | |
| Data_B | Sensor_A | xb, yb | WALL | — | dxb, dyb | |
| Data_C | Sensor_B | xc, yc | AUTOMOBILE | 5.100 | dxc, dyc | |
| ... | | | | | | |
| ... | | | | | | |
| ... | | | | | | |
| Data_Z | Sensor_A | xz, yz | WHITE LINE | — | dxz, dyz | |

EXTERNAL WORLD RECOGNITION MAP 1001 (LIST TYPE)

RELATIVE INFORMATION TABLE

| OBJECT ID | RECOGNITION DEVICE ID | RELATIVE POSITION | RELATIVE SPEED INFORMATION | RELATIVE ACCELERATION | TYPE | RANGE | ... |
|---|---|---|---|---|---|---|---|
| Data_A | Sensor_A | rxa, rya | 0.10 | 0.0 | AUTOMOBILE | dxa, dya | ... |
| Data_B | Sensor_A | rxb, ryb | 0.0 | 0.0 | WALL | dxb, dyb | ... |
| Data_C | Sensor_B | rxc, ryc | 5.20 | 1.2 | AUTOMOBILE | dxc, dyc | ... |
| ... | | ... | ... | ... | ... | ... | |
| ... | | ... | ... | ... | ... | ... | |
| Data_Z | Sensor_A | rxz, ryz | 0.0 | 0.0 | WHITE LINE | dxz, dyz | |

1301

VEHICLE CONTROL DEVICE AND VEHICLE CONTROL SYSTEM

TECHNICAL FIELD

The present invention relates to a vehicle control device and a vehicle control system.

BACKGROUND ART

A background technique in this technical field includes JP H8-34326 A (PTL 1). This publication describes that the purpose is to "evaluate the operation urgency and perform appropriate automatic brake control", and describes, as means of solution, "this device calculates physical collision risk from vehicle speed, relative speed, inter-vehicle distance, and the like (S2). Then, the operation urgency degree is calculated from the depression time from the accelerator to the brake, the time required for pressing down the brake with a predetermined strength, the operation speed of the steering, and the like (S3). If the collision risk is equal to or greater than a predetermined value and the operation urgency is equal to or larger than a predetermined value, the automatic brake is activated (S8). Therefore, as compared with the operation of automatic braking by determination based on only the collision risk, the determination according to the driver's driving situation is added, so it is possible to make determination of hazardous state with a higher degree of accuracy, and achieve effective control of automatic braking control."

Another background technique is JP 2014-191597 A (PTL 2). This publication describes that the purpose is to "start driving support system at a more appropriate timing while preventing an unintended activation of the driving support system", and describes, as means of solution, "a driving support device detects the position of an object such as a pedestrian or other vehicles ahead of the host vehicle with a camera or a radar, and predicts the course of the host vehicle based on the yaw rate, the steering angle, and the vehicle speed. Then, based on the position of the object and the predicted course, collision risk between the vehicle and the object is determined, and in the case where collision risk is high, driving support for avoiding collision is performed. The driving support device measures the curvature of the planned running road, and when the change in the curvature is small and accurate course prediction is possible, the determination sensitivity of the collision risk is increased to facilitate driving support to be started (S120), and if the change in the curvature is large and it is difficult to accurately predict the course, the driving support is caused to be difficult to start by lowering the determination sensitivity of the collision risk (S115)."

CITATION LIST

Patent Literature

PTL 1: JP H8-34326 A
PTL 2: JP 2014-191597 A

SUMMARY OF INVENTION

Technical Problem

In relation to PTL 2, in recent years, there has been proposed an automatic driving system that generates a track (automatic driving control information) representing the future position of the vehicle on the basis of external recognition information and self-location information, and controls the vehicle based on this track. Regarding PTL 1, there is also an automatic control system that calculates information relative to the surrounding objects based on the external recognition information, and assists the user.

In the automatic driving system, the range of the behavior of the vehicle that can be realized is large (high degree of flexibility), but because the automatic driving system generates tracks based on various kinds of information, it is difficult to improve the reliability as compared with the automatic control system. On the other hand, in the automatic control system, the range of the behavior of the vehicle that can be realized is small (low degree of flexibility), but as the amount of information is small, it is easy to increase the reliability. However, although these systems have been studied for the inventions to be used independently, these systems have room for consideration for mutually complementing systems.

Therefore, it is an object of the present invention to provide a system that can preferably complement the reliability of an automatic driving system with an automatic control system while effectively utilizing the automatic driving system.

Solution to Problem

In order to solve the above problem, an embodiment of the present invention may use, for example, the technical concept described in the claims.

Advantageous Effects of Invention

According to the present invention, the reliability of an automatic driving system can be complemented preferably with an automatic control system while effectively utilizing the automatic driving system.

BRIEF DESCRIPTION OF DRAWINGS

FIG. 10 is an example of a list type of an external world recognition map.
FIG. 13 is an example of relative position information (list type).

DESCRIPTION OF EMBODIMENTS

Hereinafter, examples of preferred embodiments of the present invention will be described. It should be noted that the embodiment mainly describes a vehicle control system in a vehicle system and a vehicle control device, which are suitable for implementation in the vehicle system, but do not prevent application from being applied to those other than the vehicle system.

First Embodiment

<Configuration of Vehicle Control System>

Figure 2:
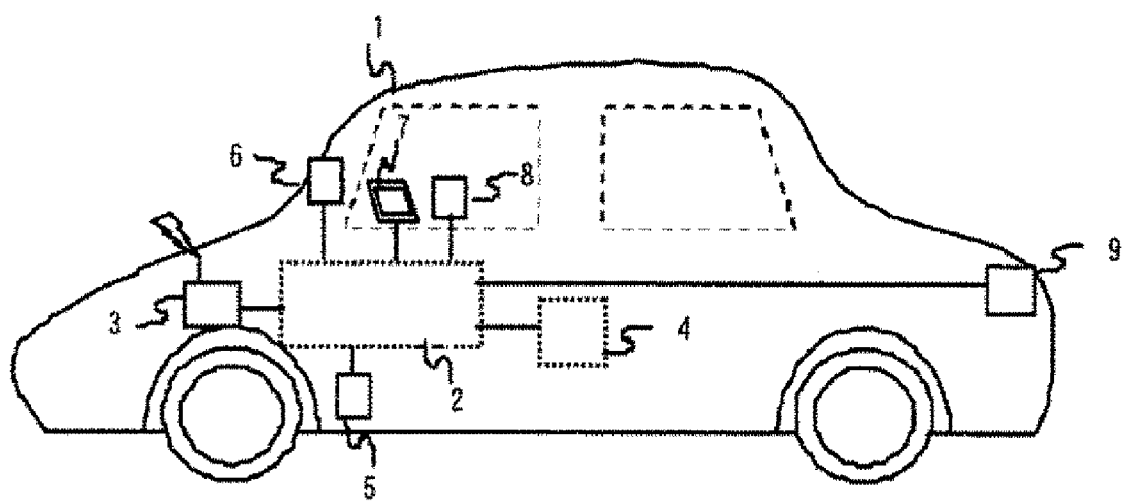
FIG. 2 is an example of a system.

FIG. 2 is an overview of a vehicle system having a vehicle control system and a vehicle control device according to the present embodiment. Reference symbol 1 denotes the vehicle system having the internal vehicle control system, such as automobile. Reference symbol 2 denotes a vehicle control system which is constituted by, for example, an on-board network (CAN: Controller Area Network, CANFD: CAN with Flexible Data-rate, Ethernet (registered trademark), and the like) and a controller (ECU: Electronic Control Unit and the like). Reference symbol 3 denotes a communication device which carries out wireless communication (communication of cellular phone, communication using protocols such as wireless LAN, WAN, and C2X (Car to X: vehicle to vehicle or vehicle to infrastructure communication), or communication using GPS: Global Positioning System) with the outside of the vehicle system 1 and performs wireless communication such as acquisition and transmission of information about external world (infrastructure, other vehicle, map) or information about the vehicle, or a communication device that has a diagnostic terminal (OBD), an Ethernet (registered trademark) terminal, an external recording medium (for example, a USB memory, an SD card, or the like) terminal and the like, and performs communication with the vehicle control system 2. Reference symbol 4 denotes a vehicle control system constituted by a network using, for example, a protocol different from or the same protocol as that of the vehicle control system 2. Reference symbol 5 denotes a drive device, such as an actuator that drives a machine and electrical device (e.g., engine, transmission, wheel, brake, steering device, and the like) to control vehicle motion according to the control of the vehicle control system 2. Reference symbol 6 denotes a recognition device constituted by an external world sensor such as camera, radar, LIDAR, ultrasonic sensor, and the like, which acquires information input from the external world and outputs information for generating external world recognition information to be described later and a dynamic system sensor that recognizes the state of the vehicle system 1 (motion state, position information, acceleration, wheel speed, and the like). Reference symbol 7 denotes an output device such as a liquid crystal display, a warning lamp, and a speaker, connected via a wire or wirelessly to the network system and receiving data sent from the network system and displaying or outputting required information such as message information (e.g., video, sound). Reference symbol 8 denotes an input device such as, a steering wheel, a pedal, a button, a lever, and a touch panel, with which the user generates an input signal for inputting an operation intention or instruction to the vehicle control system 2. Reference symbol 9 denotes a notification device, such as a lamp, an LED, and a speaker, with which the vehicle system 1 notifies the state of the vehicle and the like to the external world.

The vehicle control system 2 is connected to the other vehicle control system 4, the communication device 3, the driving device 5, the recognition device 6, the output device 7, the input device 8, and the notification device 9, and transmits and receives information to and from each of them.

Figure 3:
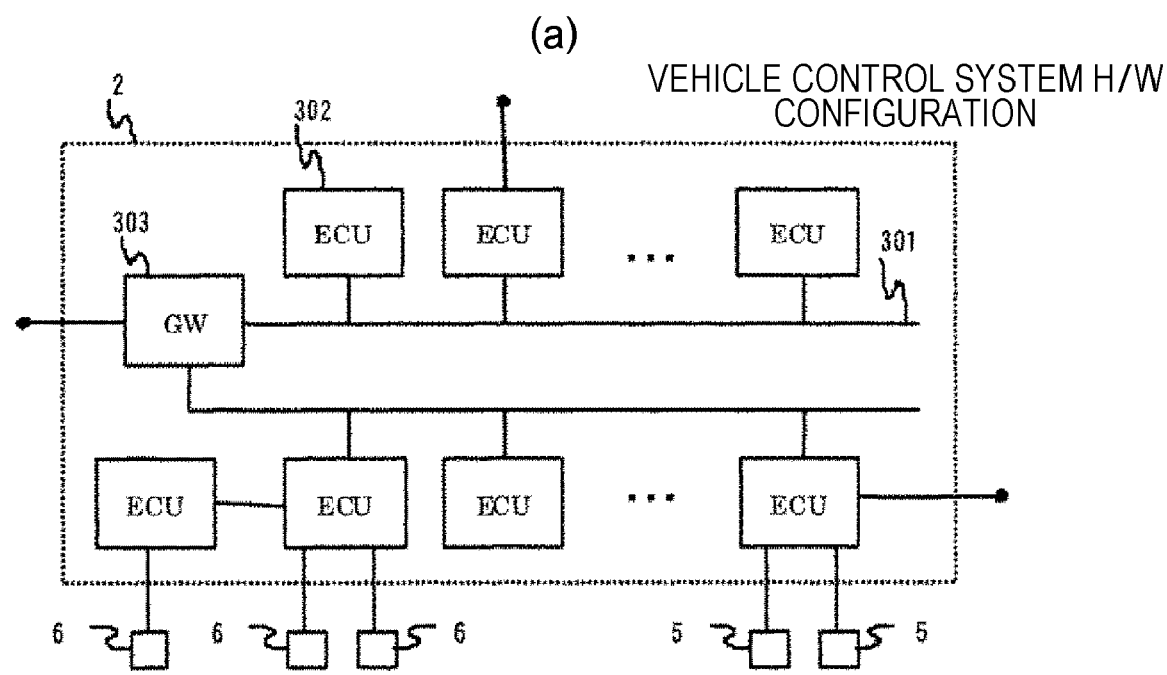
FIG. 3 is an example of a vehicle control system configuration.

FIG. 3 shows an example of H/W (Hardware) configuration of the vehicle control system 2. Reference symbol 301 denotes a network link connecting a network device on an on-board network, for example, a network link such as a CAN bus. Reference symbol 302 denotes an ECU (Electronic Control Unit) connected to the network link 301, the driving device 5, the recognition device 6, and a network link (including a leased line) other than the network link 301 to control the driving device 5 and the recognition device 6, obtain information thereof, and transmit and receive data to and from the network. Reference symbol 303 denotes a gateway (hereinafter referred to as GW) that connects multiple network links 301 and transmits and receives data to and from each network link 301.

An example of network topology is not limited to the example of the bus type in which multiple ECUs 302 are connected to two buses (network links 301) shown in FIG. 3. The network topology may be a star type in which multiple ECUs are directly connected to a GW, a link type in which ECUs are connected to a series of links in a ring form, a mixed type in which multiple types are exist in a mixed manner and configured by multiple networks, or the like. Each of the GW 303 and the ECU 302 can be an ECU having a GW function or a GW having a function of an ECU.

Based on the data received from the network, the ECU 302 performs the control processing such as output of a control signal to the driving device 5, acquisition of information from the recognition device 6, output of a control signal and information to network, change of internal state, and the like.

Figure 4:
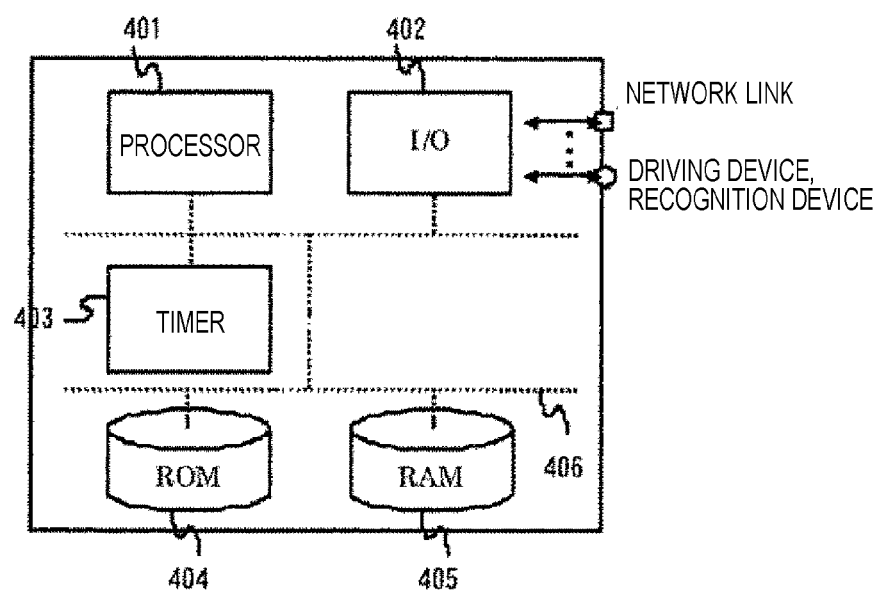
FIG. 4 shows a configuration example of a controller.

FIG. 4 is an example of an internal configuration of the ECU 302 or the GW 303 which is a network device according to the present embodiment. Reference symbol 401 denotes a processor that has storage elements such as caches and registers, and is for example, a CPU that executes control. Reference symbol 402 denotes an I/O (Input/Output) which transmits and receives data to and from the driving device 5 and/or recognition device 6 connected by the network link 301, a network, or a leased line. Reference symbol 403 denotes a timer for managing a period of time and a point in time using a clock (not shown) or the like. Reference symbol 404 denotes a ROM (Read Only Memory) for storing programs and nonvolatile data. Reference symbol 405 denotes a RAM (Random Access Memory) for storing volatile data. Reference symbol 406 denotes an internal bus used for communication inside the ECU.

Figure 5:
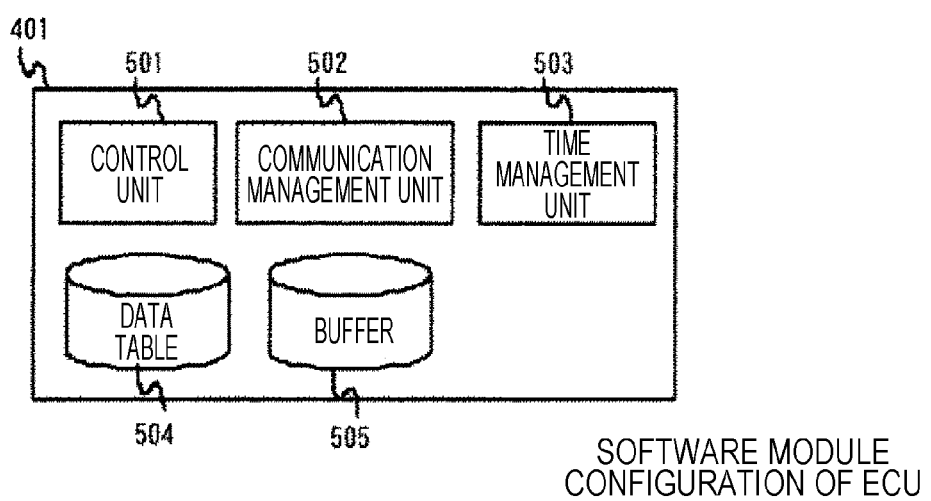
FIG. 5 is an example of the software module configuration of the controller.

Next, FIG. 5 shows a configuration of a software module operating on the processor 401. Reference symbol 502 denotes a communication management unit that manages the operation and state of the I/O 402 and instructs the I/O 402 via the internal bus 406. Reference symbol 503 denotes a time management unit that manages the timer 403 and performs information acquisition and control with regard to time. Reference symbol 501 denotes a control unit that analyzes data acquired from the I/O 402 and controls the entire software module. Reference symbol 504 denotes a data table that holds information such as an external world recognition map described later. Reference symbol 505 denotes a buffer for temporarily holding data.

The configuration of FIG. 5 shows the operation concept on the processor 401. The information necessary for operation is, as necessary, acquired from the ROM 404 and the RAM 405 or, as necessary, written in the ROM 404 and the RAM 405 to be operated. Each function of the vehicle control system described later is executed by the control unit 501.

<Functional Configuration Example of Vehicle Control System>

Figure 6:
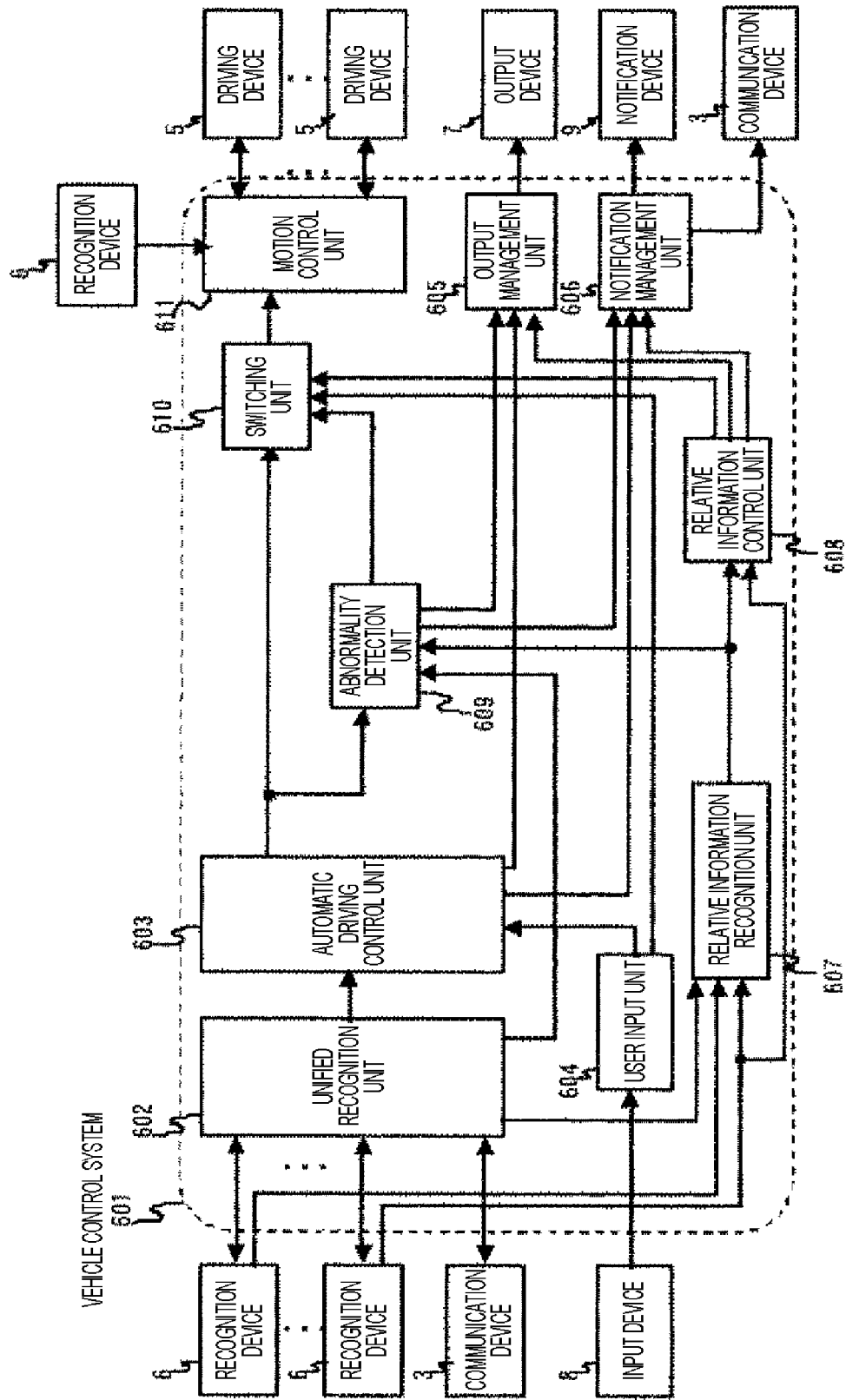
FIG. 6 is a configuration example of the vehicle control system.

FIG. 6 shows a functional configuration example of the vehicle control system. Reference symbol 601 denotes an entire vehicle control system. Reference symbol 602 denotes a unified recognition unit which unifies the external world recognition information output from multiple recognition devices 6 and communication devices 3 and creates an external world recognition map to be described later. Reference symbol 603 denotes an automatic driving control unit that performs generation and output of automatic driving control information (track and the like), based on the external world recognition map generated by the unified recognition unit 602 and the user input received from a user input unit 604, output instruction to an output management unit 605, and notification instruction to a notification management unit 606. Reference symbol 604 denotes a user input unit that generates the instruction information about the user according to the input from the input device 8. Reference symbol 605 denotes an output management unit that performs an output instruction to the output device 7 in accordance with the output of the automatic driving control unit 603 and an abnormality detection unit 609 and a relative information control unit 608. Reference symbol 606 denotes a notification management unit that performs a notification instruction to the notification device 9 in accordance with the output of the automatic driving control unit 603 and the abnormality detection unit 609 and the relative information control unit 608. Reference symbol 607 denotes a relative information recognition unit for creating relative information to be described later on the basis of the information input from the unified recognition unit 602 and information output from the recognition device 6. Reference symbol 608 denotes a relative information control unit which creates motion control information from information output from the recognition device and the relative information created by the relative information recognition unit 607. Reference symbol 609 denotes an abnormality detection unit for detecting abnormality from the relative information created by the relative information recognition unit 607, the automatic driving control information output from the automatic driving control 603, and the output result of the unified recognition unit 602. Reference symbol 610 denotes a switching unit for switching the output for the motion control unit 611 to the input from the automatic driving control unit 603 or the input from the relative information control unit 608 based on the abnormality detection result of the abnormality detection unit 609. Reference symbol 611 is a motion control unit that carries out control for multiple driving devices 5 in accordance with the track information or the motion control information from the switching unit 610, the state of the vehicle system 1 acquired from the recognition device 6, and the response from the driving device 5.

The motion control information indicates target values of motion control parameters such as acceleration and yaw rate, control instruction values to each driving device 5, and continuous values thereof in time series.

The vehicle control system may include some or all of the communication device 3, the driving device 5, the recognition device 6, the output device 7, the input device 8, and the notification device 9. In addition, the vehicle control device refers to a device having some or all of the functions in the vehicle control system.

Figure 7:
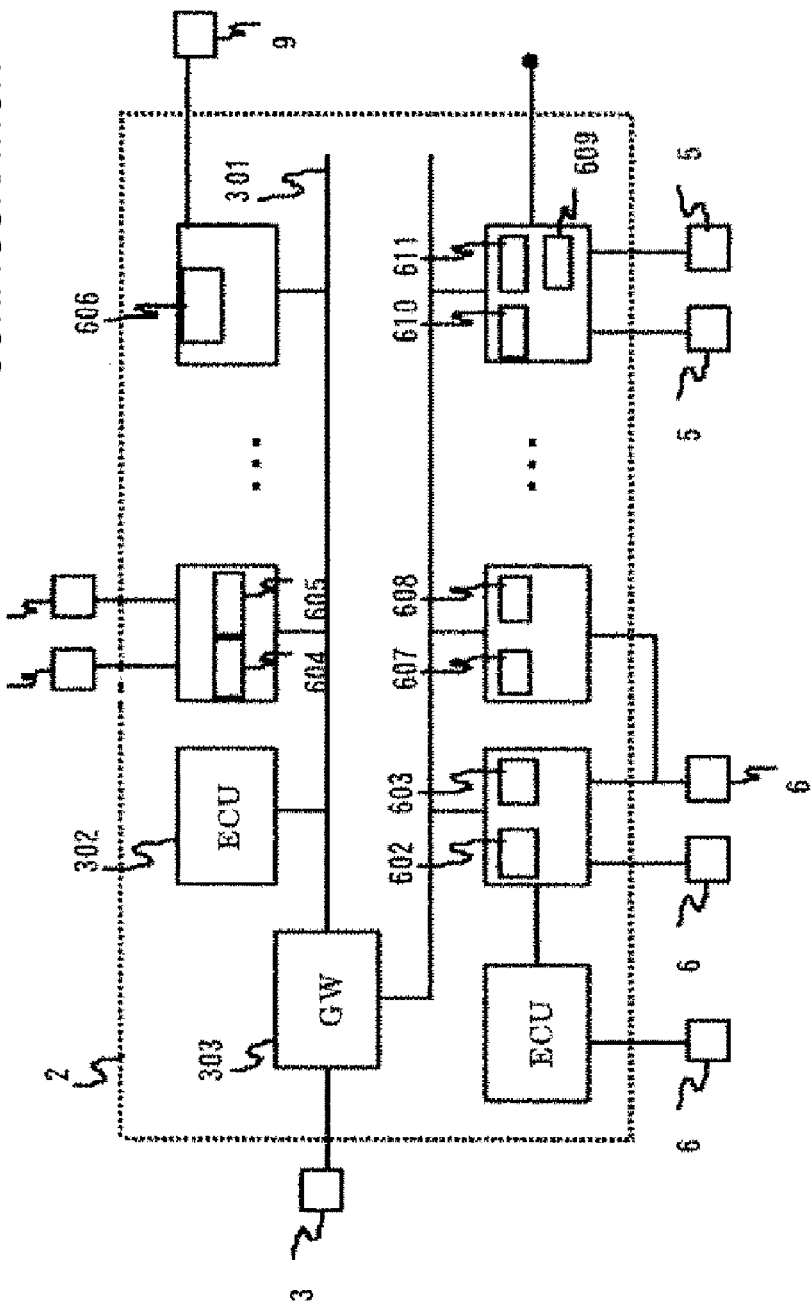
FIG. 7 is an arrangement example of the vehicle control system function.

The vehicle control system 601 is composed of multiple functions, and there are plural patterns of function arrangements to the H/W shown in FIG. 3. An example of arrangement is shown in FIG. 7. The arrangement of the functions is not limited thereto, and the functions may be assigned to ECUs different from the description. For example, when the functions of the unified recognition unit 602, and the automatic driving control unit 603, the relative information recognition unit 607, and the relative information control unit 608 are assigned to different ECUs or microcomputers, it becomes possible to protect each function from the risk of common cause failure due to H/W failure, and high reliability can be realized.

<External World Recognition Method>

The type of the recognition device 6 is as described in the configuration of the vehicle control system, and the recognition device 6 acquires external world recognition information to be described later according to the operating principle corresponding to the type of each recognition device. For example, the recognition device 6 performs measurement of the external world using the sensor of the recognition device 6, and the recognition device 6 applies a specific algorithm (for example, an image recognition algorithm for the acquired image) to the measured value, and acquires the external world recognition information.

For each recognition device, the measurable range is decided beforehand (for example, in the case of a camera, the recognition limit of the far distance according to the photographing direction, the vertical/horizontal angles, and the number of pixels, and in the case of a radar, a radiation angle and a receiving angle of a radio wave, a distance), or adjustment (calibration) is performed for the change according to the environment, so that the measurable range is measured and determined. By combining the obtained external world recognition information obtained by each recognition device, the surrounding condition of the vehicle system 2 can be confirmed.

Figure 8:
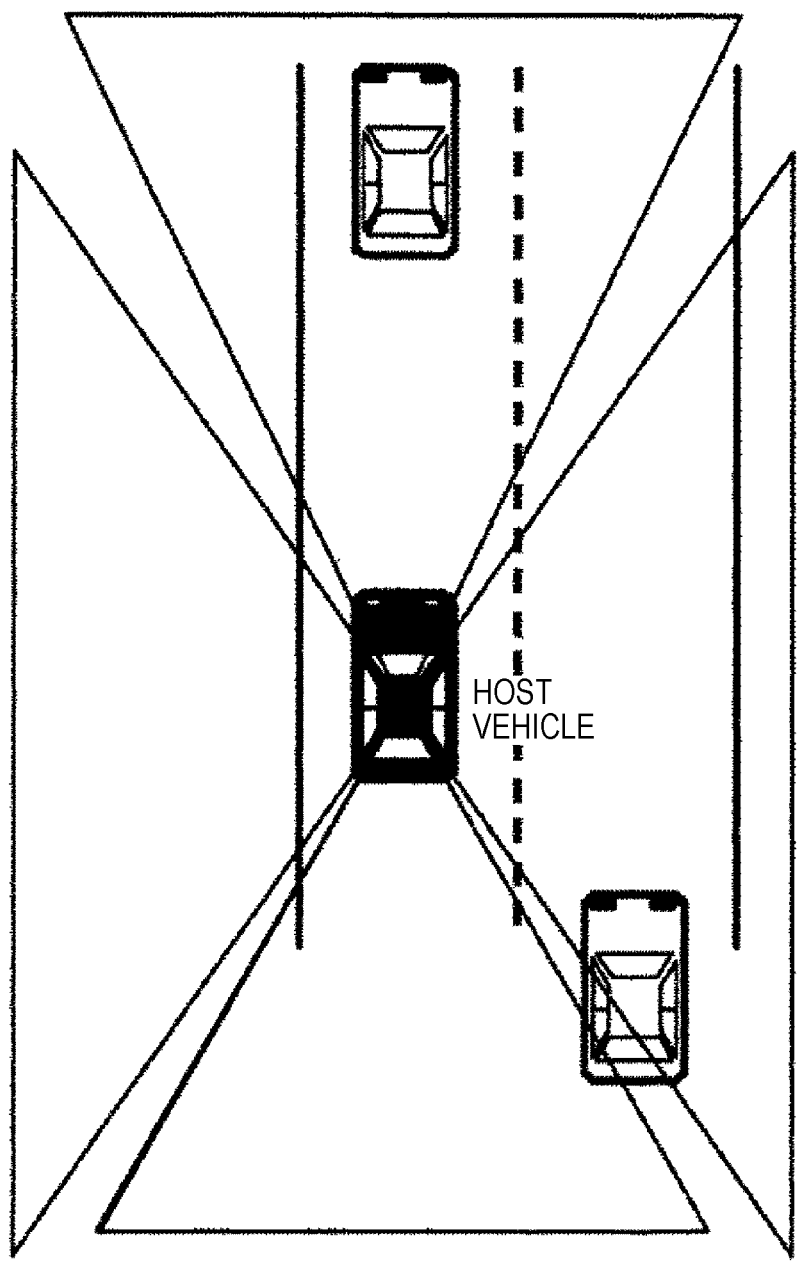
FIG. 8 is an example of external world recognition.

An example of external world recognition is shown in FIG. 8. In this example, the recognition devices 6 in four directions of the vehicle system 1 acquire external world information. With the external world recognition information output from the recognition device 6, the unified recognition unit 602 can check what objects are present in the vicinity.

Likewise, from the communication device 3, the external world recognition information can also be obtained. With the information that can be obtained from the communication device 3, the external world recognition information about an object existing on the other side of the obstacle such as a shadow, which cannot be observed by the recognition device 6, is obtained together with position information, and the existence position of the object can be confirmed.

The external world recognition information acquired by the communication device 3 also includes map information about the surroundings (topography, road, and lane information), and road traffic conditions (traffic density, under construction, and the like).

<External World Recognition Information>

The external world recognition information is information that expresses the object observed by the recognition device 6 or the object received by the communication device 3. Examples of external world recognition information include an object type (static object (wall, white line, signal, separation band, tree, and the like), a dynamic object (pedestrian, car, motorcycle, bicycle, and the like), or driving (region intrusion) permissibility, other attribute information), relative position information about an object (direction and distance), absolute position information about an object and itself (coordinates and the like), an object speed, direction (moving direction, face direction), acceleration, existence probability (probability), map information, road traffic condition, time when external world recognition information was measured, ID of recognition device that performed measurement, and the like.

<External World Recognition Map>

Figure 9A:
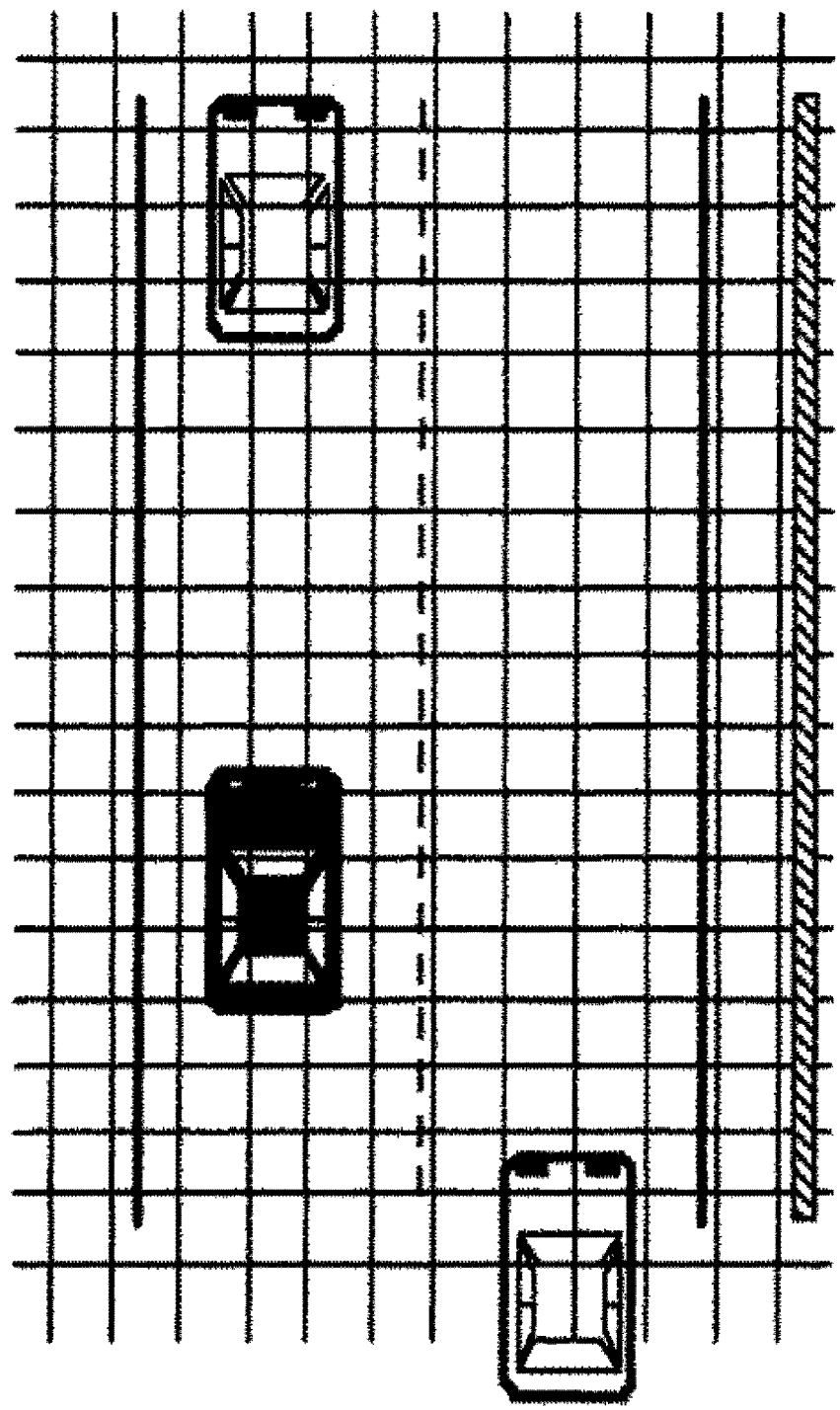
FIG. 9(a) is an example of a coordinate system of an external world recognition map.
Figure 9B:
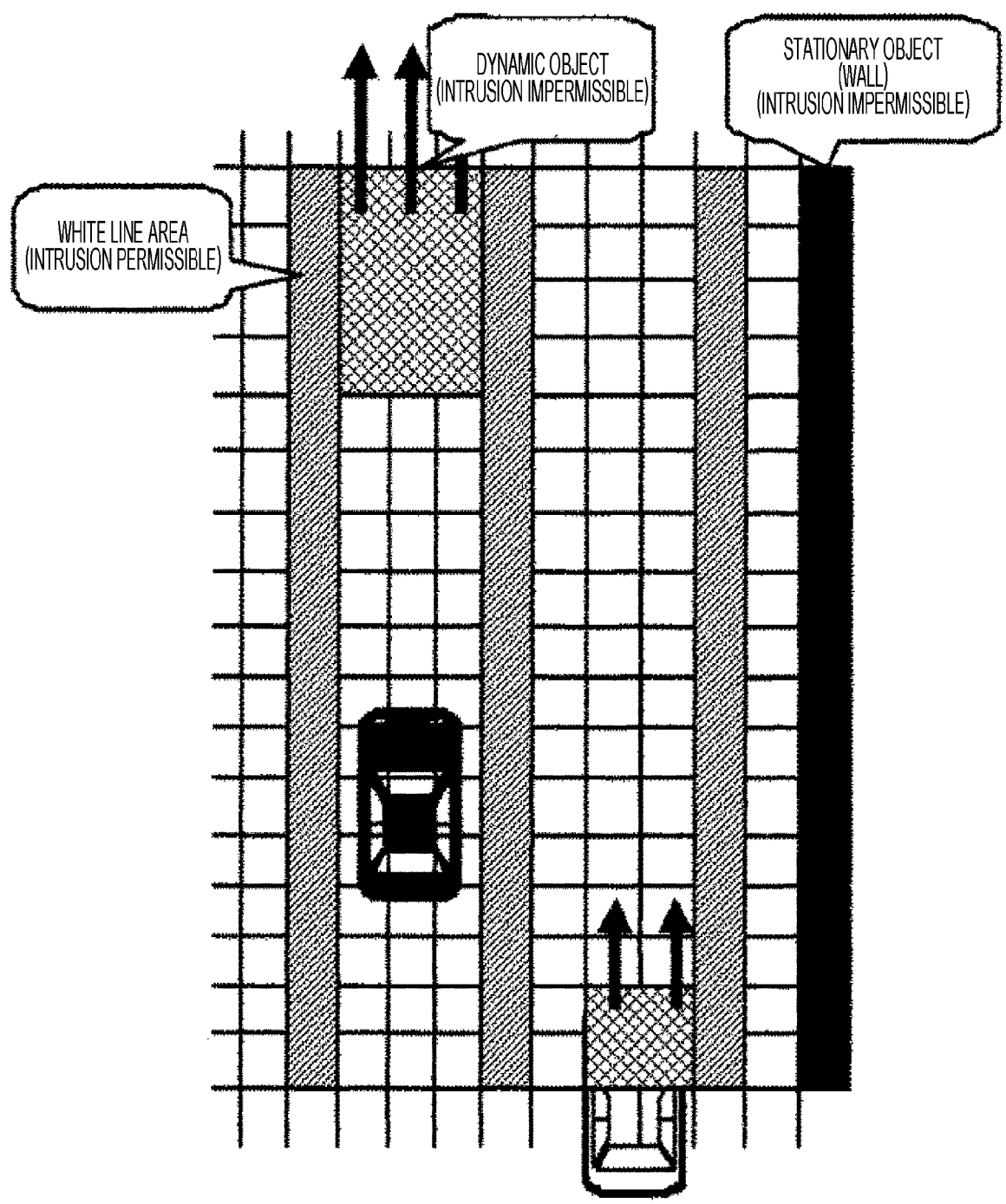
FIG. 9(b) is an example of arranging objects in an external world recognition map.

The unified recognition unit 602 creates unified recognition information (e.g., external world recognition map) in which external world recognition information output by multiple recognition devices is unified. An example of external world recognition map is shown in FIG. 9. FIG. 9(b) shows an example in which object information is arranged for each region with respect to the orthogonal coordinate system (grid) (FIG. 9(a)). The object information is the contents excluding the position information from the example of the external world recognition information, and is arranged on each grid.

The representation of the external world recognition map may be not only the notation by the grid but also a list type method which lists for each recognized object. An example of the list type notation is shown in FIG. 10. Reference symbol 1001 denotes the entire external world recognition map by list display. By holding the external world recognition map in the list type like this, it is possible to reduce the amount of data compared with the grid type.

<Behavior Prediction>

The external world recognition map can be created not only by using the currently recognized external world recognition information but also by prediction (behavior prediction) from the external world recognition information in the past. For example, after a certain period of time, if an object is a stationary object, it is highly likely that the object exists at the same position (not the relative position with the vehicle, but the same position on the road surface). When an object is a dynamic object, it is possible to predict the position of the object after a certain period of time from the position, speed, acceleration and the like immediately before. By using the external world recognition information predicted in this manner, it is possible to predict the position information that cannot be recognized currently.

Although the behavior prediction can be performed by the unified recognition unit 602 on the basis of the external world recognition map, for example, the recognition device 6 adds future prediction information to the external world recognition information and transmits the external world recognition information to notify the unified recognition unit 602. In that case, each recognition device 6 performs prediction, and it becomes possible to reduce the amount of calculation related to the behavior prediction of the unified recognition unit 602. In another method, the automatic driving control unit 603 may perform the behavior prediction of a necessary object from the current external world recognition map. In this case, it is possible to reduce the communication load from the unified recognition unit 602 to the automatic driving control unit 603, and it is also possible to perform behavior prediction of only objects necessary for track generation and determination.

<Automatic Driving Control Information (Track)>

With regard to the generation method of automatic driving control information based on the external world recognition map, an example using track which is an example of automatic driving control information will be described. The track is generated to satisfy safety constraints with which the vehicle system can travel safely (e.g., low possibility of collision with other obstacles), and motion constraints such as acceleration, deceleration, and yaw rate that the vehicle system can realize.

For example, the track is represented by a set of coordinates of the position of the host vehicle with a regular time interval. In another example, the track is represented by a set of motion control values (target acceleration and yaw rate) with a regular time interval, a vector value (direction and speed) of the vehicle with a regular time interval, a time interval for traveling a certain distance, and the like.

Figure 11:
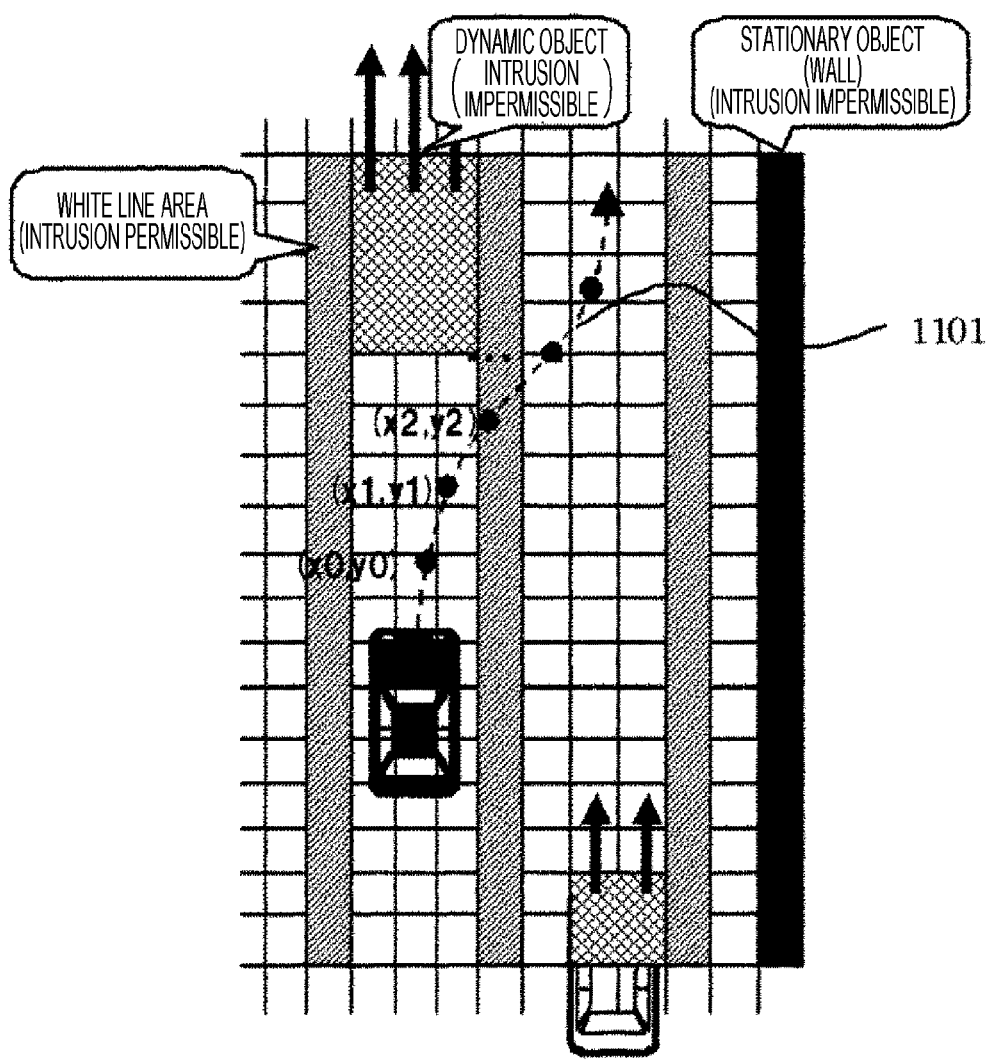
FIG. 11 is an example of a track generation based on external world recognition map information.

In the external world recognition map in the example of FIG. 9(b), an example of track generation in which the vehicle moves to the right lane will be described with reference to FIG. 11. Here, an example is shown in which there is a traveling vehicle on the right lane, and the host vehicle travels at a faster speed and can perform lane change. First, the host vehicle satisfies the motion constraint, and generates a track (1101 in FIG. 11) for moving to the right lane. To satisfy the motion constraint means that the vehicle system does not exceed the upper limit value or the lower limit value of the acceleration and deceleration, yaw rate, and the like that can be realized by the vehicle system as described above. Thereafter, for the track 1101 that has been generated, it is calculated whether or not collision occurs by the prediction track (for example, current speed, position after a certain period of time with the assumed acceleration) of the other dynamic object and the track in the host vehicle. If it is calculated that collision does not occur, control of the vehicle is performed based on the track of the host vehicle. If it is calculated that collision occurs, the vehicle system waits for a certain period of time, and thereafter, recalculates or generates another track satisfying the motion constraint, and similarly calculates the safety constraint.

The safety constraint calculation method includes not only a method (entry prohibited area method) in which the area assumed by the current speed and the assumed acceleration and deceleration speed of the dynamic object is adopted as an entry prohibited area as described above, but also a method for calculating the risk of each area from the type, speed, and travelling direction of each object and calculating the risk potential. When this method is used, a track with the lowest potential is generated so that the track which does not enter into the potential area having a certain value or more in the generated potential map, and satisfies the motion constraint of the host vehicle is adopted as a generation track.

In the entry prohibited area, behavior prediction of the dynamic object is required. For the behavior prediction, there is a method of setting, as an entry prohibited area, a certain area centered on a point moving with the current speed, acceleration and direction. By setting the certain area as the entry prohibited area like this, computation with complicated prediction becomes unnecessary.

As described above, the track is created based on the direction in which the vehicle moves, the motion constraint, and the safety constraint, the automatic driving control unit 603 transmits the track information to the motion control unit 611 via the switching unit 610 based on the generated track, and the motion control unit 611 controls the driving device 5 based on the track information and controls the vehicle system.

<Control Based on Automatic Driving Control Information>

The motion control unit 611 performs control of the driving device 5 so as to realize the motion control information or the automatic driving control information output by the switching unit 610.

In the control based on the automatic driving control information, for example, when the automatic driving control information is the track, the system state (current speed, acceleration, yaw rate, and the like) of the vehicle system 1 acquired from the recognition device 6 is reflected so as to be able to follow the track, and the target speed, the yaw rate, and the like of the vehicle system 1 are calculated. In order to realize these target speed and yaw rate, the control of each of the necessary driving devices 5 is performed. As a result, the vehicle control that can follow the target track is realized.

In order to realize control by motion control information, the output of the engine torque is increased to achieve the target speed, the brake is controlled to decelerate, the steering is steered to achieve the target yaw rate, or the braking or acceleration is individually controlled for each of the wheels so that the wheel speed becomes unequal. In the case where the motion control information is the control value of the driving device 5, the control of the driving device 5 is performed using the control value. In this way, the target motion control is realized.

<Relative Information Recognition>

The relative information is information that is in the external world recognition information, particularly that can be acquired from the recognition device 6, and is a combination of pieces of information of any one of relative position, relative speed, relative acceleration between a surrounding object and the host vehicle, and a value that can be calculated form these values.

Figure 12:
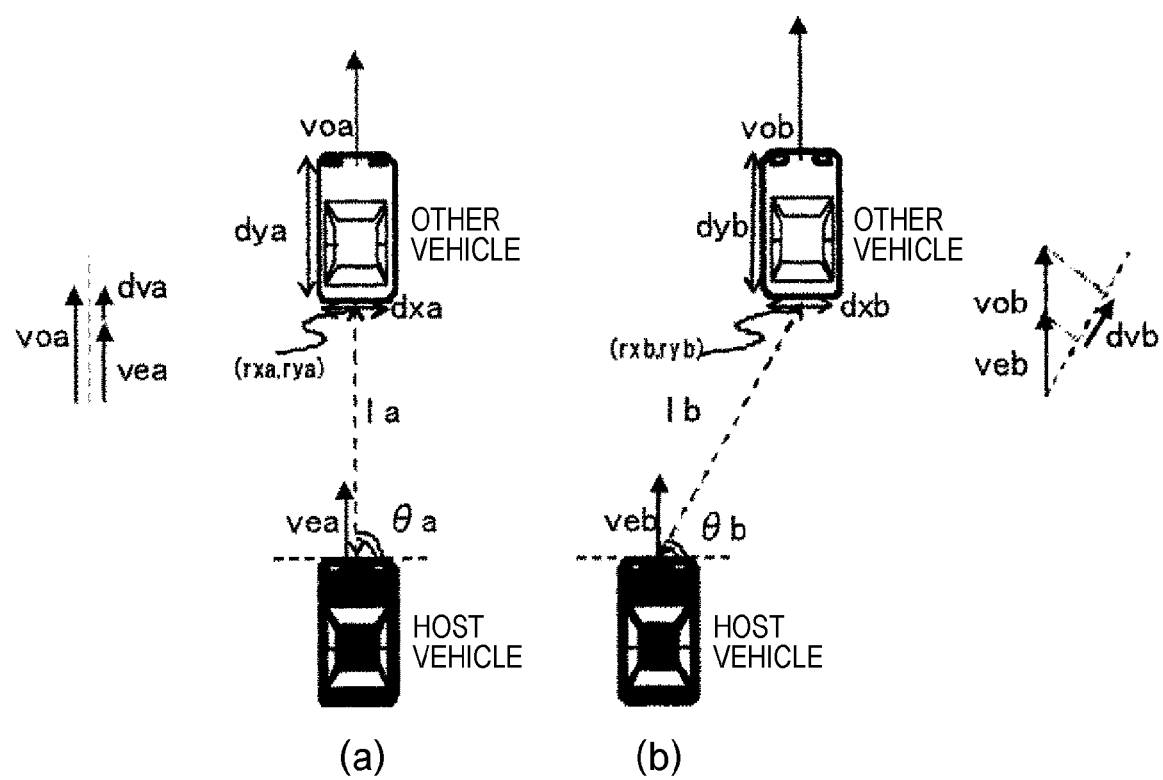
FIG. 12 is an example of relative position information.

An example of relative information is shown in FIG. 12. In this case, an example of recognizing other vehicles is shown. In FIG. 12(a), there is a vehicle ahead, and an example is shown in which the distance as a relative position is 1a, the angle is θa where the right-hand side horizontal direction of the host vehicle is defined as zero degrees, and the relative speed is dva.

The relative speed indicates the speed with which the host vehicle approaches or leaves the object. For example, in the example of FIG. 12(a), the direction from the host vehicle to another vehicle and the traveling direction of both of them are the same, and therefore, the relative speed can be expressed as a difference between the speed of the preceding vehicle and the speed of the host vehicle. As shown in FIG. 12(b), when the direction from the host vehicle to another vehicle and the traveling direction of both of them are not the same, the relative speed dvb can be derived by projecting each speed on a straight line of direction from the host vehicle to another vehicle and calculating the difference thereof. In this case, when the relative speed is positive, it indicates that the another vehicle is moving away from the host vehicle, and when it is negative, it indicates that the another vehicle is approaching the host vehicle. Although not shown, the relative acceleration is a time change of the relative speed, so that the relative acceleration can be calculated from the observed change in the speed.

In addition to expression of the relative distance and the angle, the representation method of the relative position may also be represented as a coordinate system with the host vehicle being the origin. As an example, the relative position can be represented in such a manner that the host vehicle is the origin in the figure, and the longitudinal direction of the host vehicle is y coordinate where the travelling direction is positive, and the lateral direction is x coordinate where the right-hand side is positive (rxa, rxy).

When the recognition device 6 is recognizable, the applicable object type (vehicle, pedestrian, and the like), the width (dxa in the figure) of the object, and the depth (dya in the figure) are also included as the relative information.

An example of relative information table for managing the relative information is shown in FIG. 13. An example using representation of coordinate system is shown as the relative position. As described above, the relative information is generated and managed.

<Control Based on Relative Information>

A control example based on relative information will be described. The relative information control unit 608 generates motion control information based on the relative information output by the relative information recognition unit 607 and the state of the host vehicle acquired from the recognition device 6.

An example in the case where an object (vehicle) exists ahead will be described. In the case where there is a vehicle ahead and the relative position (distance) in the relative information falls below a certain value, the host vehicle is controlled to decelerate. For this purpose, the relative information control unit 608 determines the state of the host vehicle acquired from the relative information and the recognition device 6, and outputs the motion control information for performing deceleration to the switching unit 610. On the contrary, when the relative position exceeds the certain value, the motion control information for controlling acceleration is likewise output to the host vehicle. As described above, the acceleration and deceleration control is performed so that the relative position with respect to a preceding vehicle does not exceed or fall below a certain amount. Likewise, when an object exists behind, the control is performed so that the relative position does not exceed or fall below a certain amount.

It is also possible to make a determination based not only on the relative position but also on the relative speed and relative acceleration. For example, in the case where there is a vehicle ahead and the relative position is the same, the control for deceleration is performed if the object is likely to approach the host vehicle with the relative speed and the relative acceleration. The calculation formula of the risk value for the above judgment is as follows, where the risk value is denoted as R, the relative distance is denoted as d1, the relative speed is denoted as dv, and the relative acceleration is denoted as da. Here, A, B, and C are constants.

[Math 1]

$$R = A \cdot d1 + B \cdot dv + C \cdot da \tag{1}$$

In the calculation using a risk value, just like the determination based on the relative position, the acceleration and deceleration control is performed so that the risk value does not exceed a certain amount. By making determinations using the relative speed and the relative acceleration as described above, it is possible to suppress a higher risk situation with the same relative position (another vehicle is approaching the host vehicle, and the like) and to ensure safety.

With these determinations and acceleration and deceleration control, the control based on relative information can be performed.

If there are vehicles ahead and behind the host vehicle at the same time, the control is performed so that the relative position moves away from the closer one. For example, in the case where the preceding vehicle is moving closer, the control of the deceleration is performed, while if the vehicle behind is moving closer, the control of the acceleration is performed.

Not only in the longitudinal direction but also in the lateral direction, the recognition is performed from the relative position, and steering is performed in the direction where an object does not exist, so that, for example, the control is performed to avoid collision in the longitudinal direction. The target yaw rate for that purpose is also included in the motion control information, and the relative information control unit 608 performs the output to the switching unit 610.

Many determinations may be used in the determination of the certain amount of the relative position and the risk value. For example, in the case of exceeding a certain amount α, a warning may be given to the user, and in the case of exceeding a certain amount β, weak acceleration and deceleration may be performed, and when exceeding a certain amount γ, strong acceleration and deceleration may be performed. This enables stepwise warning and vehicle control for the user according to the situation when an abnormality occurs.

<Abnormality Detection>

A detection method of an abnormality will be described. The abnormality is a state different from the expected normal state, which occurs due to hardware failure, software malfunction, unexpected input, and the like. Each unit of the vehicle control system 2 communicates via a communication path such as a network or a leased line, and with the abnormality of communication, the following occurs; communication cannot be performed (communication processing is an error response, the potential of signal line is abnormal), a signal value of communication is abnormal, and the like. For the abnormality of these communications, abnormality of communication can be detected by detecting abnormality in an electric circuit (potential detection and the like), periodic survival confirmation (heartbeat), and error detection of error detection symbol such as CRC.

For the malfunction of the computation device, abnormality can be detected by checking the result obtained by performing the same computation (comparison of computation results), and for the malfunction of a memory, detection can be performed by error detection and the like when accessing the RAM or ROM.

Software malfunction can be detected by not only performing comparison of results obtained by performing the same computation but also detecting the range abnormality of output result.

The abnormality detection unit 609 detects these abnormalities by itself or by receiving a notification made by detecting abnormality from each unit. For example, the automatic driving control unit 603 gives, to the automatic driving control information, as information that the abnormality is occurring in any one of the recognition device 6, the communication device 3, the unified recognition unit 602, and a communication therebetween. The abnormality detection unit 609 receives the information and detects an occurrence of abnormality. The switching processing described later is carried out with the result obtained by detecting abnormality.

The abnormality detection unit 609 informs the output management unit 605 and/or the notification management unit 606 that abnormality has been detected. Therefore, the output management unit 605 and/or the notification management unit 606 carry out an output of a vehicle state described later to the user and/or a notification of the vehicle state to the outside of the vehicle.

Therefore, the safety can be improved by, for example, detecting abnormality with this system, and switching from the control with the automatic driving control unit 603 to control with the relative information control unit 609.

<Switching Processing>

Figure 1:
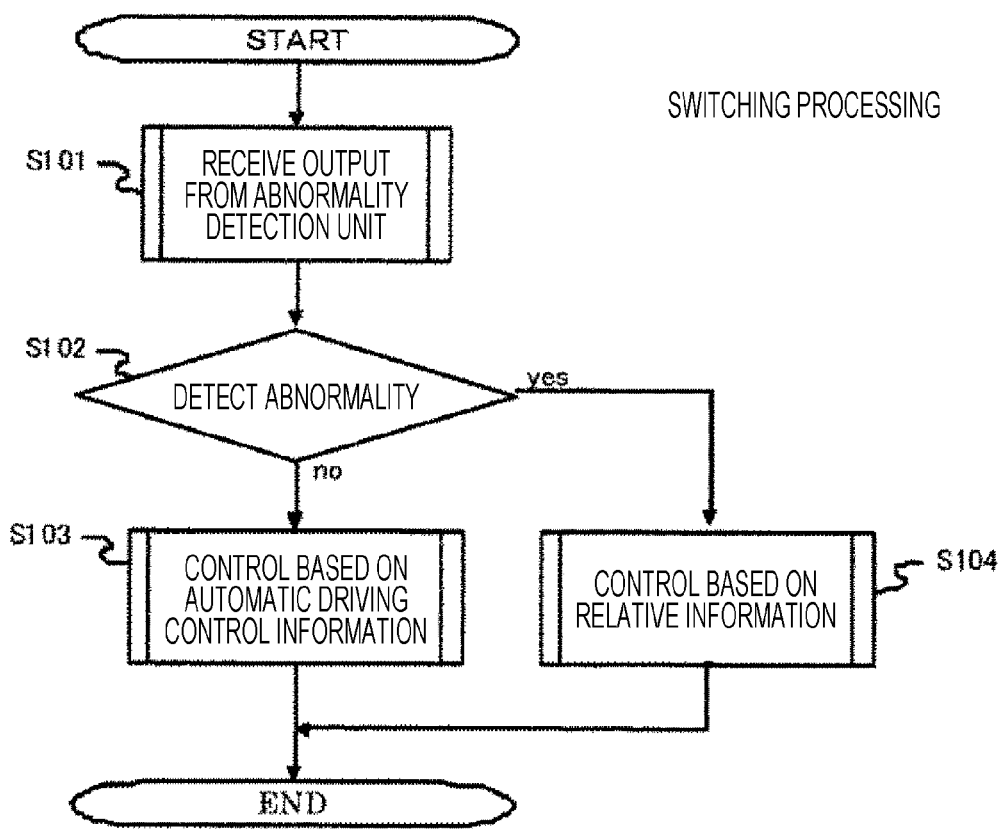
FIG. 1 is a flowchart showing switching processing at the time of detecting an abnormality in a vehicle control system.

Switching processing of control implemented in the switching unit 610 will be described with reference to FIG. 1. First, the switching unit 610 receives abnormality detection result from the abnormality detection unit 609 (S101). In the case where the abnormality detection result is absence of abnormality (no in S102), switching is performed so as to output the motion control information created based on the automatic driving control information output from the automatic driving control unit 603 (S103). In the case where the abnormality detection result is presence of abnormality (yes in S102), switching is performed so as to output the motion control information output from the relative information control unit 608 (S104). As described above, control switching in abnormality detection is carried out. This makes it possible to improve safety by switching to control using the relative information control unit 608 without using the output of the automatic driving control unit 603 in which an abnormality occurs.

On the other hand, in the case where the abnormality detection unit 609 detects that an abnormality has occurred in the relative information recognition unit 607, switching is not performed to the motion control information output from the relative information control unit 608. In this case, the abnormality detection unit 609 instructs the switching unit 610 to output the motion control information created based on the automatic driving control information output from the automatic driving control unit 603, and warning operation is carried out with an output of the following vehicle state to the user and a notification of the vehicle state to the outside of the vehicle. Therefore, even in the case where an abnormality occurs in the control function using the relative information, a warning is issued to the user to urge handover, and the operation is continued with the control of the automatic driving control unit 603 where an abnormality does not occur, so that the safety can be improved.

<Output of Vehicle State to User and Notification of Vehicle State to Outside of Vehicle>

As shown in FIG. 2, the vehicle control system 2 outputs a current state of a vehicle to the user via the output device 7 or to the outside of the vehicle via the notification device 9 or the communication device 3. For example, when the abnormality occurs in any unit of the vehicle system 1, illumination of warning and the like or warning with sound is performed for the user via the output device 7. An output of the warning state with a lamp, warning sound with a speaker, and output and the like of information and the like about abnormality are performed for the outside of the vehicle via the notification device 9 or the communication device 3.

When the abnormality detection unit 609 detects an abnormality, the occurrence of the abnormality is notified to the user with warning and the like or sound, and further, the content of abnormality (each unit where the abnormality occurred, communication path) is displayed with a display or a warning lamp provided with the output device 7. Therefore, it is possible for the user to recognize the abnormality that has occurred, and to perform handover of manipulation.

In addition, likewise, the outside of the vehicle is also notified of the occurrence of abnormality, a range where the abnormality occurred, a direction of a track, or the like via the notification device 9 or the communication device 3. Therefore, it becomes possible for the vehicle travelling behind to predict the behavior of the vehicle system 1 where the abnormality has occurred, and it is possible to avoid collision and the like.

<User Handover Control>

Figure 18:
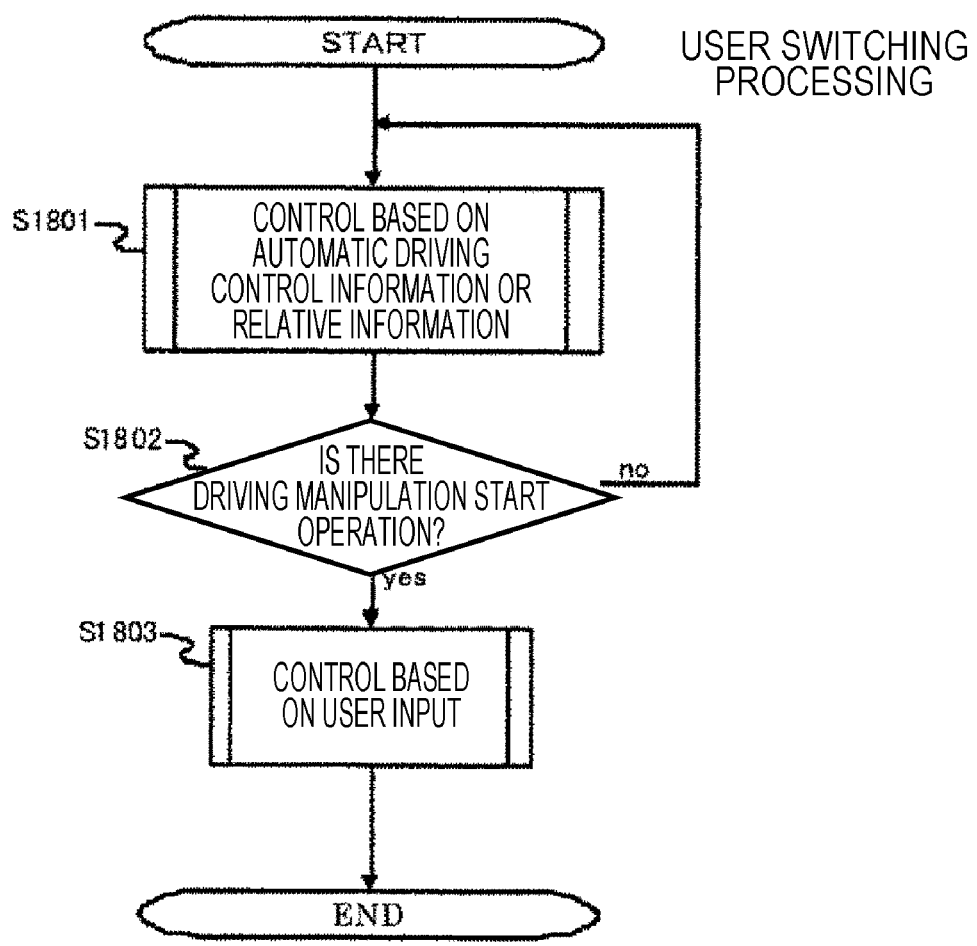
FIG. 18 is a flowchart showing switching processing by a user.

An example of switching to the control by a user from control based on automatic driving control information or control based on relative information will be described based on FIG. 18. In the case where the user input unit 604 detects the driving manipulation start operation (for example, stepping on for pedal, manipulating steer, pushing the button of automatic driving, and the like) of the user via the input device 8 (yes in S1802) while control is performed with the automatic driving control information or the relative information (S1801), the switching unit 610 is notified. When the switching unit 610 receives the notification of the driving manipulation start operation of the user, the control based on the automatic driving control information and the relative information is cancelled, and the control is switched to the driving manipulation of the user (S1803). As described above, the switching is performed from the automatic driving control and the control based on and the relative information to the driving manipulation of the user, and even if there is an error in the automatic driving control information and/or the relative information, the control is handed over to the user, and the safety is maintained.

Second Embodiment

As an example of abnormality detection, an example using the relative information and the automatic driving control information will be described. The difference from the first embodiment is the processing of an abnormality detection unit 609.

As a method for detecting abnormality detection of the automatic driving control information by using only the relative information, an abnormality is determined when each value of the relative information becomes equal to or more than a certain value or the risk value becomes equal to or more than a certain value. This is because, since the automatic driving control information is assumed that the control is performed so that the risk value and each value of the above relative information does not exceed a certain value or fall below a certain value, the situation is determined to be abnormal, and the control is switched to the control using the relative information control. Therefore, even in the case where an abnormality occurs in the automatic driving control information, it becomes possible to switch to the safe control using the relative information.

Figure 14:
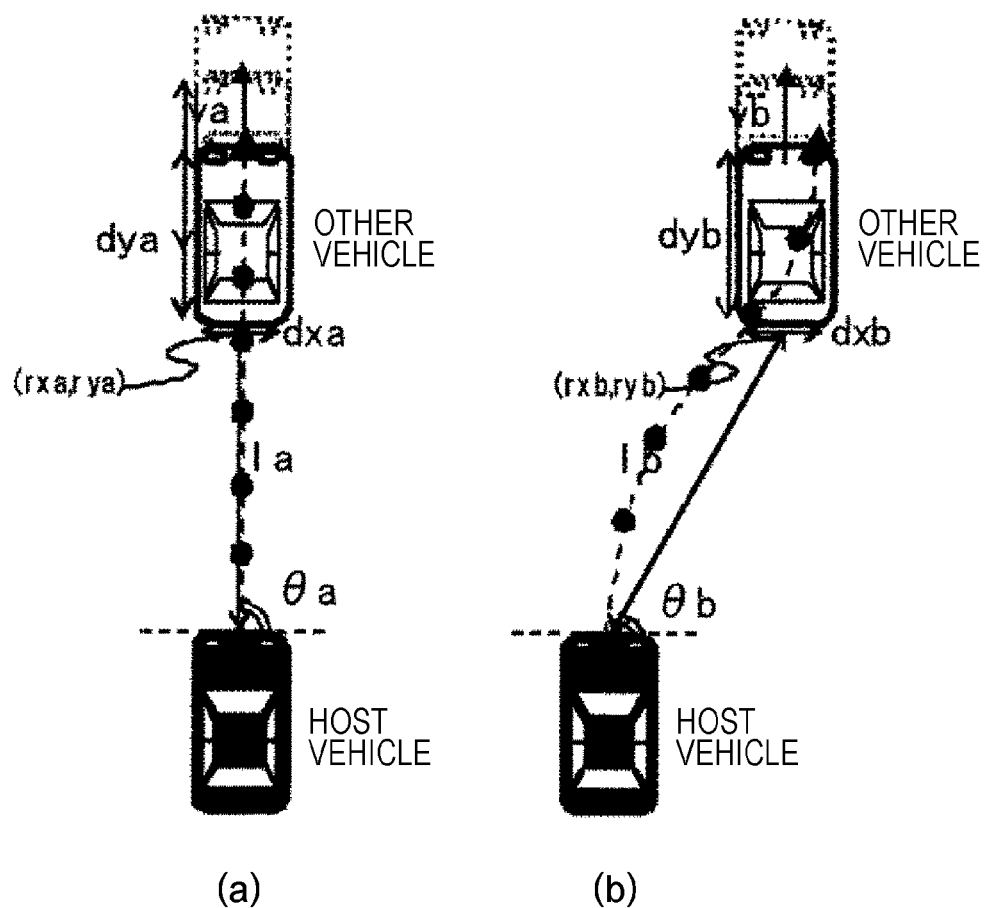
FIG. 14 is an example of the determination based on the automatic driving control information and relative information.

As another determination method, the abnormality detection unit 609 detects abnormality when the positions of the host vehicle and another object in the future that are estimated from the automatic driving control information and the relative information come into contact with each other or come into proximity with each other. An example of determination of the relative information and the automatic driving control information in the abnormality detection unit 609 is shown in FIG. 14. In FIG. 14, the automatic driving control information (track) of the host vehicle is indicated by a circle and a dotted line, and the relative position information is described using the example of FIG. 12.

Since the track shows the future position of the host vehicle at each time, the future position of the relative information is also predicted. More specifically, the position is analogized from relative position, relative speed, and relative acceleration of relative information. The calculation expression is shown with a one-dimensional position as an example, and can be expressed as follows; the position at t seconds later is denoted as y(t), the current position is denoted as y(0), the relative speed is denoted as vy, and the relative acceleration is denoted as ay. In this case, for example, the acceleration term can be omitted to reduce computation amount.

[Math 2]

$$y(t) = y(0) + vy*t + \frac{1}{2}ay*t^2 \quad (2)$$

In the case of two dimensions, the computation is performed in the same way for prediction, and the future relative position based on the relative information is predicted. This prediction result and the track information are compared, and an abnormality is detected when the future relative position based on the track information and the relative information after a certain time come into contact with each other or the relative distance becomes equal to or less than a certain value.

After detecting the abnormality, in addition to performing control using the relative information, the output of a vehicle state to the user and a notification of the vehicle state to the outside of the vehicle is performed, and the user is encouraged to start handover or a notification of an occurrence of abnormality is given to the outside of the vehicle at an early stage, so that it is possible for a vehicle and the like outside the vehicle to perform the avoidance operation with a large safety margin.

An example in which the automatic driving control information is the track has been shown in the above case, but even in the case of consecutive control values, the determination can be similarly made by estimating the position of the host vehicle after a certain period of time.

In another method, an abnormality is detected by comparing the relative information with the output result of the unified recognition unit 602. For example, the abnormality can be detected by comparing the relative information and the output result of the unified recognition unit 602, for example, in a case where another object is not included in the output result of the unified recognition unit 602 even though the another object is determined to exist based on the relative information.

In the method of the detection, in addition to the presence and absence of the object, each output result is compared, and in the case where the position, the speed, and the existence probability of another object exceed a designed error range, the abnormality is detected. As a result, a fault occurring in the unified recognition unit 602, the recognition device 6, and the relative information recognition unit 607 can be detected.

In the present embodiment, with the above determination, the abnormality of the automatic driving control information can be detected using the relative information. An abnormality can be detected at the stage when the automatic driving control information is output, and switching to the control using the relative information or a warning to the user or surroundings can be carried out at an early stage. Therefore, for example, abnormality of the track information in the future can be detected before the travel control using the track information is performed, and the actuator control can be handed over to the more reliable automatic control system at an early stage. Therefore, it is possible to highly reliable travel control while preventing the actuator from actually being controlled based on the abnormal track information. As a result, while using the automatic driving system effectively, it is possible to complement the reliability of the automatic driving system satisfactorily by the automatic control system.

Third Embodiment

Next, an example of control to avoid erroneous braking by an error in the automatic driving control information will be described. The configuration of the vehicle control system is the same as that of the second embodiment.

Figure 15:
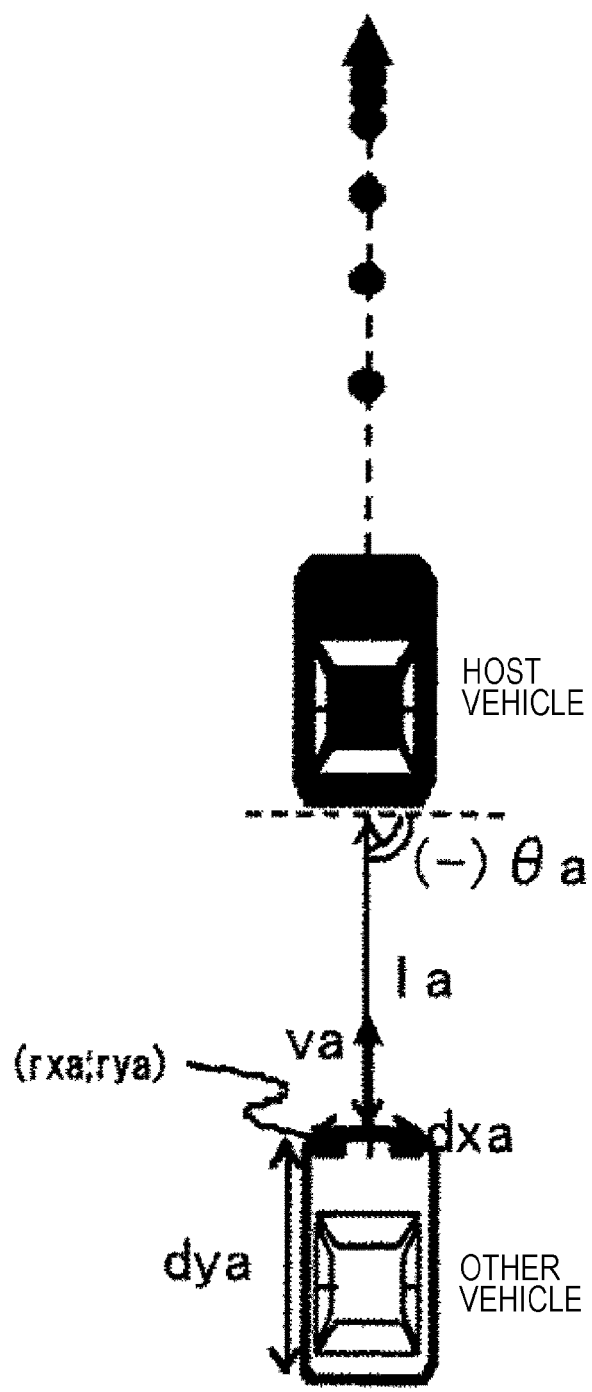
FIG. 15 is an example of automatic driving control information and relative information according to a third embodiment of the present invention.

FIG. 15 shows an example in which the automatic driving control information for erroneously braking is output from the automatic driving control unit 603 in a situation where another vehicle is present behind the travelling host vehicle.

In this case, the abnormality detection unit 609 receives the automatic driving control information from the automatic driving control unit 603, and receives the relative information in the situation from the relative information recognition unit 607. Thereafter, the abnormality detection unit 609 determines the abnormality of the automatic driving control information by abnormality detection described in the second embodiment and instructs the switching unit 610 to switch to the control based on the relative information. This makes it possible to switch to the control based on the relative information before performing erroneous braking by abnormal automatic driving control information.

Here, in FIG. 6, the abnormality detection unit 609 is described as processing concurrent with the communication between the automatic driving control unit 603 and the switching unit 610, but the abnormality detection unit 609 may be arranged between the automatic driving control unit 603 and the switching unit 610, and the abnormality detection unit 609 may be configured to output only the automatic driving control information for which the abnormality has not been detected to the switching unit 610. With this configuration, it is possible to reliably suppress the control based on the automatic driving control information in which the abnormality is detected.

In the configuration of FIG. 6, the switching unit 610 may assign an ID to the automatic driving control information and after receiving a notification that the motion control information having the ID from the abnormality detection unit 609 is normal or not abnormal, the switching unit 610 may output the motion control information of the automatic driving control information, so that the control based on the automatic driving control information in which the abnormality is detected can be surely suppressed similarly.

As described above, even if the automatic driving control information for performing braking by mistake and colliding with the vehicle behind is derived when there is a vehicle travelling behind, it is possible to prevent erroneous braking based on the relative information and realize reliable travel control.

Fourth Embodiment

Figure 16:
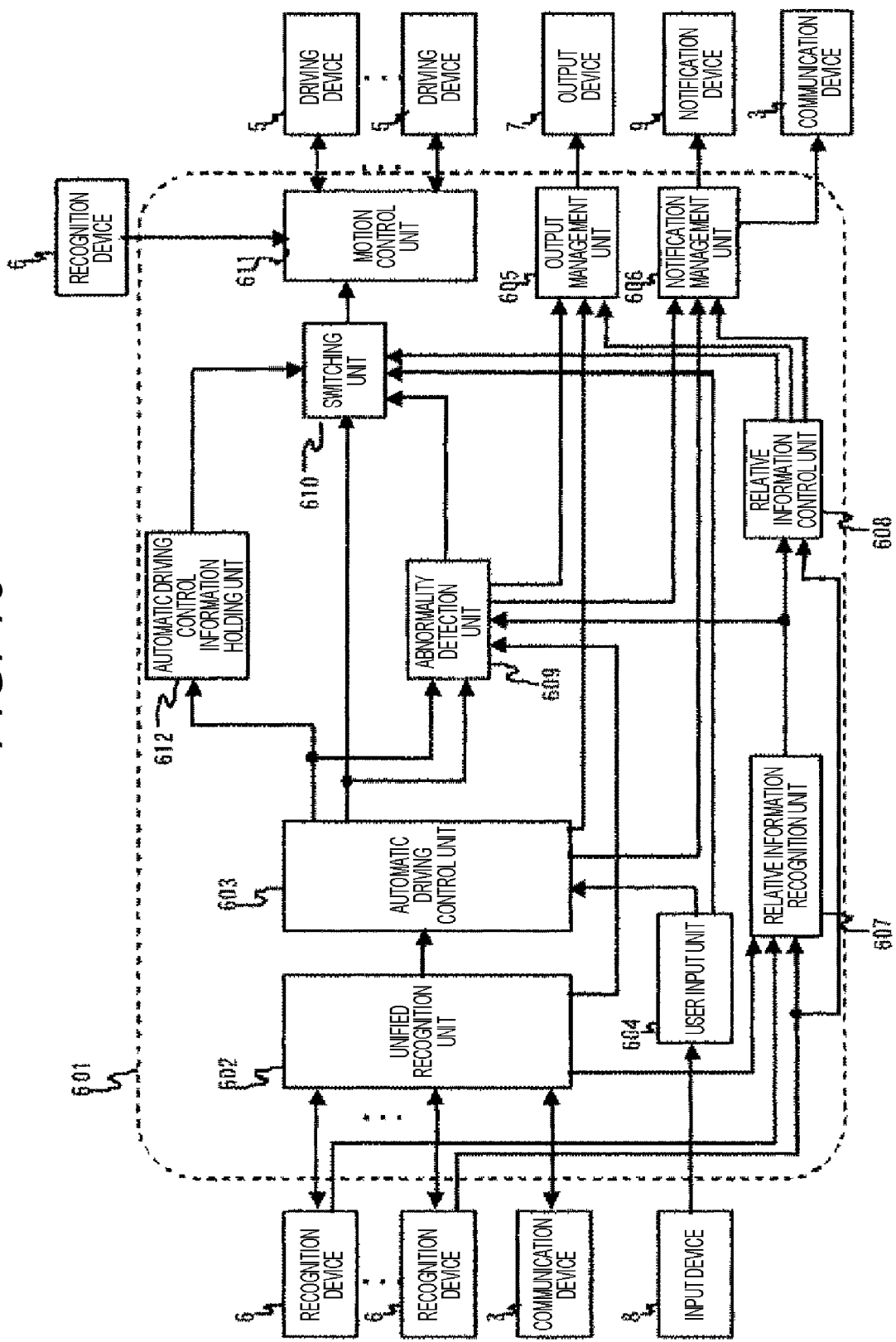
FIG. 16 is an example of a vehicle control system configuration according to a fourth embodiment of the present invention.

In the present embodiment, an automatic driving control information holding unit 612 which holds the automatic driving control information and performs output as necessary is added. A configuration example of the vehicle control system 2 according to the present embodiment is shown in FIG. 16.

In the automatic driving control unit 603, automatic driving control information is calculated, and automatic driving control information that can ensure minimum safety when an abnormality occurs (for example, travelling along a lane, travelling along a lane and slowly decelerating, pulling over to the shoulder and stop, and the like, hereinafter referred to as "holding control information") is also calculated. Then, the holding control information calculated by the automatic driving control unit 603 is transmitted to the automatic driving control information holding unit 612. The automatic driving control information holding unit 612 is for holding the holding control information transmitted from the automatic driving control unit 603 and switching to the holding control information held therein when an abnormality occurs.

When the holding control information calculated by the automatic driving control unit 603 is transmitted to the automatic driving control information holding unit 612, the holding control information is also transmitted to the abnormality detection unit 609, and the abnormality detection unit 609 detects presence or absence of abnormality with regard to the holding control information.

The switching unit 610 switches the control information from the automatic driving control unit 603, the relative information control unit 608, and the automatic driving control information holding unit 612, and outputs the information to the motion control unit 611.

Figure 17:
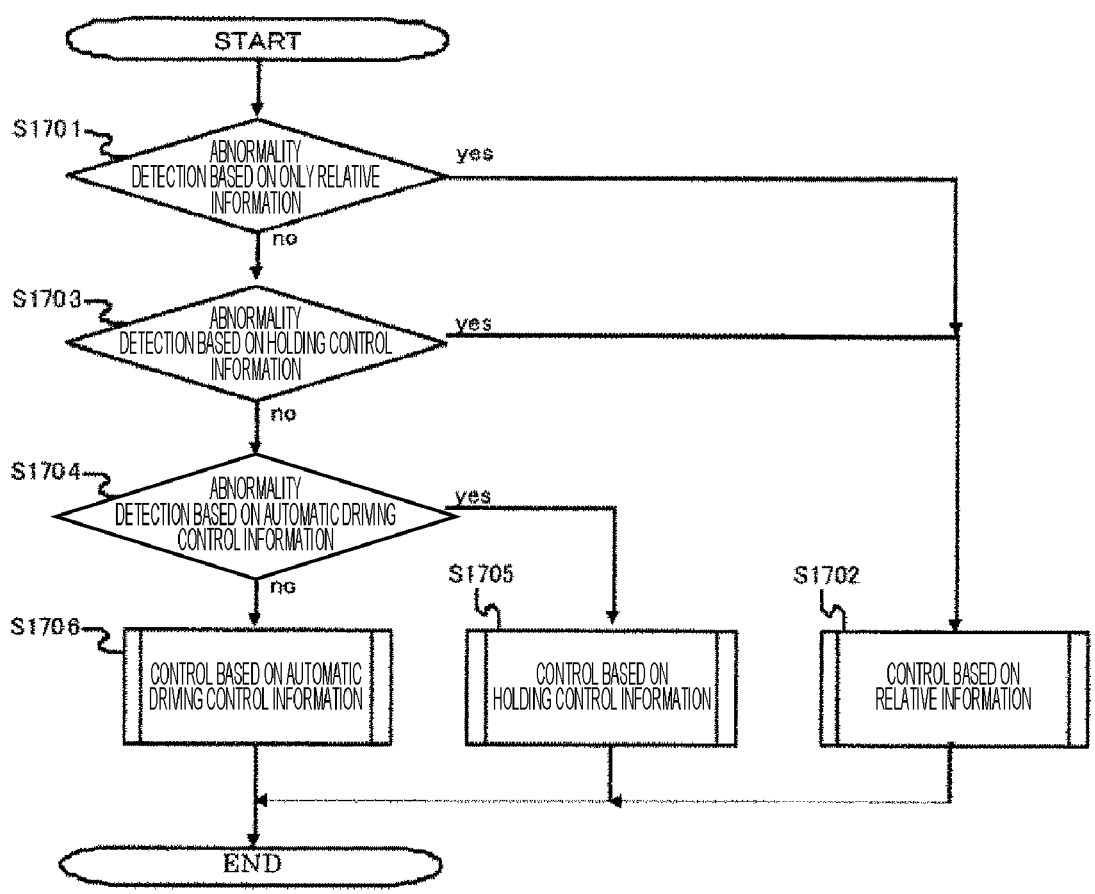
FIG. 17 is a flowchart showing a switching processing at the time of abnormality detection according to the fourth embodiment of the present invention.

The determination method is shown in FIG. 17. First, the abnormality detection unit 609 receives the automatic driving control information, the holding control information, and the relative information, determines abnormality, and notifies the switching unit 610 of whether the result indicates that the abnormality is detected with only the relative information, the abnormality is detected in the holding control information, or the abnormality is detected in the automatic driving control information. In the method of the abnormality detection, information detected in the method described in the abnormality detection of the first embodiment is included in the respective information, or the abnormality is detected by comparing the automatic driving control information and the relative information according to the abnormality detection method described in the second embodiment, and for abnormality detection of the holding control information, the abnormality detection is performed according to the same method as the automatic driving control information.

When the switching unit 610 receives a notification indicating that an abnormality is detected with only the relative information (yes in S1701), the switching unit 610 performs control based on the relative information (S1702). When the notification indicating that the abnormality is detected with the holding control information is received (yes in S1703), the control based on the relative information is performed (S1702). When the notification indicating that the abnormality is detected with the automatic driving control information is received (yes in S1704), the control based on the holding control information is performed (S1705). When none of the abnormalities is notified (no in S1704), the control by the automatic driving control information is performed (S1706).

Therefore, even when the abnormality occurs with the automatic driving control information, it becomes possible to perform control with the holding control information which is capable of maintaining safety that has been held for a certain period of time and in which abnormality has not been detected, and in addition, when an abnormality is thereafter detected with the relative information, it becomes possible to safely switch to the control based on the relative information. As a result, reliable travel control can be realized.

According to the above-described embodiment, when an abnormality occurs in the automatic driving control information, it is possible to ensure safety by detecting the abnormality and switching to the control based on the relative information.

According to another embodiment, before implementing control based on the automatic driving control information, the abnormality of the automatic driving control information is detected from the relative information and the automatic driving control information, operation corresponding to the abnormality can be performed at an early stage by switching to the control based on the relative information or by giving a warning to the user or the outside.

According to still another embodiment, the control based on the automatic driving control information in which an abnormality has been detected can be suppressed, and the control based on the relative information can be implemented.

According to still another embodiment, the holding control information is used, so that even when an abnormality occurs with the automatic driving control information, it is possible to maintain the function with the holding control information which is capable of maintaining safety that has been held for a certain period of time and in which abnormality has not been detected, and in addition, when an abnormality is thereafter detected with the relative information, it becomes possible to safely switch to the control based on the relative information.

REFERENCE SIGNS LIST 1 vehicle system
2 vehicle control system
3 communication device
4 vehicle control system
5 driving device
6 recognition device
7 output device
8 input device
9 notification device
301 network link
302 ECU
303 GW
401 processor
402 I/O
403 timer
404 ROM
405 RAM
406 internal bus
501 control unit
502 communication management unit
503 time management unit
504 data table
505 buffer
601 vehicle control system
602 unified recognition unit
603 automatic driving control unit
604 user input unit
605 output management unit
606 notification management unit
607 relative information recognition unit
608 relative information control unit
609 abnormality detection unit
610 switching unit
611 motion control unit
612 automatic driving control information holding unit
1001 external world recognition map
1301 relative information table

The invention claimed is:

1. A vehicle control device comprising:
at least a first electronic control unit, the first electronic control units includes
a processor, an input/output device, a timer, a ROM and a RAM each communicatively coupled;
at least one actuator; and
a plurality of sensors, the plurality of sensors are communicatively coupled to the first electronic control units and the at least one actuator via a gateway that connects multiple network links,
wherein the processor receives, via the input/output device, an input of a first control signal generated based on automatic driving control information from the plurality of sensors,
wherein the processor outputs a second control signal generated based on relative information between a host vehicle and a surrounding object from the plurality of sensors,
wherein the processor analyzes the first control signal and determines if there is a malfunction within the vehicle control device based on the automatic driving control information, and in a case where the malfunction is detected outputs the second control signal to the actuator instead of outputting the first control signal.

2. The vehicle control device according to claim 1, wherein information serving as an input of the automatic driving control information includes more variables than information serving as an input of the relative information.

3. The vehicle control device according to claim 1, wherein in a case where the malfunction is detected in the automatic driving control information, travelling control is performed so that a relative position in the relative information does not become equal to or less than a predetermined value.

4. The vehicle control device according to claim 1, in a case where the malfunction is detected in the automatic driving control information, travelling control is performed so that a risk value based on the relative information does not become equal to or less than a predetermined value.

5. The vehicle control device according to claim 1, wherein when the risk value calculated from the relative information becomes equal to or less than a predetermined value, the automatic driving control information is determined to be malfunctioning.

6. The vehicle control device according to claim 1, wherein relative position information in the relative information and relative position information the automatic driving control information are compared by the processor, and
in the case where the automatic driving control information is such that a risk value to a surrounding object in the relative position information is equal to or more than a predetermined value, the automatic driving control information is determined to be malfunctioning.

7. The vehicle control device according to claim 1, comprising holding automatic driving control information,
wherein in a case where the malfunction is detected in the automatic driving control information, instead of the first control signal, a third control signal based on the holding automatic driving control information is output to the actuator, and in a case where the malfunction is detected in the holding automatic driving control information, the second control signal is output to the actuator.

8. The vehicle control device according to claim 7, wherein relative position information in the relative information and relative position information the automatic driving control information are compared, and in the case where the automatic driving control information is such that a risk value to a surrounding object in the relative position information is equal to or more than a predetermined value, the automatic driving control information is determined to be malfunctioning.

9. The vehicle control device according to claim 1, wherein in a case where the automatic driving control information is malfunctioning, a notification is output.

10. The vehicle control device according to claim 1, wherein only in a case where the malfunction is not detected in the automatic driving control information, is the automatic driving control information is output to the actuator.

11. The vehicle control device according to claim 1, wherein a malfunction of unified recognition information is detected by comparing the relative information and the unified recognition information obtained by unifying output information of a recognition device and a communication device.

12. The vehicle control device according to claim 1, further comprising:

a second electronic control unit including a second processor, a second input/output device, a second timer, a second ROM and a second RAM each communicatively coupled; and a third electronic control unit including a third processor, a third input/output device, a third timer, a third ROM and a third RAM each communicatively coupled, wherein the plurality of sensors are communicatively coupled to the first electronic control unit, the second electronic control unit, the third electronic control unit and the at least one actuator via a gateway that connects multiple network links, the first control signal is output from the second processor to the processor of the first control unit, and the second control signal is output from the processor of the first control unit to the third processor.

* * * * *